(12) United States Patent
Doi et al.

(10) Patent No.: US 7,069,041 B2
(45) Date of Patent: Jun. 27, 2006

(54) RADIO TERMINAL APPARATUS AND ITS RECEPTION CONTROL PROGRAM

(75) Inventors: Yoshiharu Doi, Gifu (JP); Seigo Nakao, Gifu (JP); Takeo Miyata, Gifu (JP); Tadayoshi Ito, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 89 days.

(21) Appl. No.: 10/483,977

(22) PCT Filed: Jul. 12, 2002

(86) PCT No.: PCT/JP02/07136

§ 371 (c)(1),
(2), (4) Date: Jan. 16, 2004

(87) PCT Pub. No.: WO03/009496

PCT Pub. Date: Jan. 30, 2003

(65) Prior Publication Data

US 2004/0185893 A1    Sep. 23, 2004

(30) Foreign Application Priority Data

Jul. 19, 2001    (JP) .............................. 2001-219332

(51) Int. Cl.
- *H04M 1/00* (2006.01)
- *H04B 7/00* (2006.01)
- *H04B 15/00* (2006.01)
- *H04B 7/14* (2006.01)

(52) U.S. Cl. ................ 455/525; 455/550.1; 455/553.1; 455/63.4; 455/25

(58) Field of Classification Search ............. 455/452.1, 455/525, 550.1, 553.1, 63.4, 25
See application file for complete search history.

(56) References Cited

U.S. PATENT DOCUMENTS

| | | | |
|---|---|---|---|
| 5,952,963 A | 9/1999 | Shen et al. | |
| 6,233,452 B1 | 5/2001 | Nishino | |
| 6,370,377 B1 | 4/2002 | Take et al. | |
| 6,748,246 B1 * | 6/2004 | Khullar | 455/574 |
| 2001/0014588 A1 | 8/2001 | Ishida | |
| 2002/0072366 A1 | 6/2002 | Take et al. | |

FOREIGN PATENT DOCUMENTS

| | | |
|---|---|---|
| JP | 11-32030 | 2/1999 |
| JP | P2001-77750 A | 3/2001 |

(Continued)

OTHER PUBLICATIONS

"Adaptive Signal Processing by Array Antenna", Nobuyoshi Kikuma,, Kagaku Gijutsu Shuppan, pp. 35-49, Nov. 1998.

*Primary Examiner*—Joseph Feild
*Assistant Examiner*—Marisol Figueroa
(74) *Attorney, Agent, or Firm*—McDermott Will & Emery LLP

(57) ABSTRACT

A base station transmits information in a downlink signal that identifies whether the base station is an adaptive array base station. If a terminal capable of performing diversity reception determines that a terminal to be connected is an adaptive array base station, it stops to perform diversity reception and set an antenna used for an uplink signal transmission to be used for an immediately following reception among a plurality of antennas (11, 12). Thus, a reception effectively utilizing transmission directivity from the adaptive array base station is attained, and interference wave can be reduced. These process are executed with software by DSP (18).

10 Claims, 9 Drawing Sheets

FOREIGN PATENT DOCUMENTS

| | | |
|---|---|---|
| JP | P2001-230712 A | 8/2001 |
| TW | 398159 | 7/2000 |
| WO | WO 99/40648 | 8/1999 |
| WO | WO 00/79702 A1 | 12/2000 |

* cited by examiner

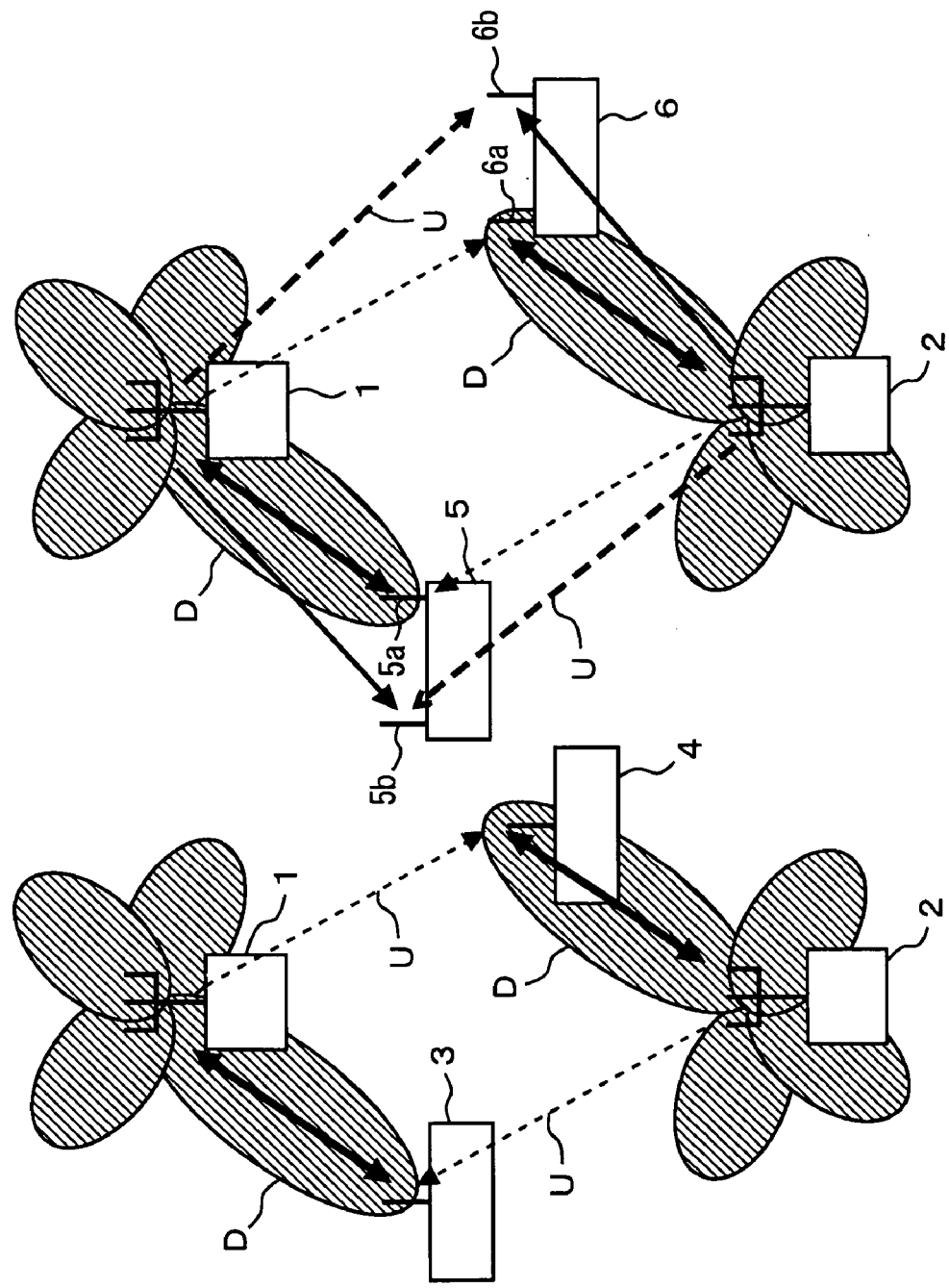

RADIO TERMINAL APPARATUS AND ITS RECEPTION CONTROL PROGRAM

TECHNICAL FIELD

The present invention relates to a radio terminal apparatus and a reception operation control program thereof, and specifically, to a radio terminal apparatus that selects the type of a reception operation in accordance with the type of a radio base station to be connected, and a reception operation control program for controlling such an operation.

BACKGROUND ART

Recently, in a mobile communication system (e.g., Personal Handyphone System: hereinafter referred to as PHS) that has been developing rapidly, PDMA (Path Division Multiple Access) scheme is proposed, which can connect radio terminal apparatuses (terminals) of a plurality of users to a radio base station (base station) in a spatial multiplexing manner, by spatially dividing an identical time slot of an identical frequency for improving the frequency effectiveness of a radio wave.

In this PDMA scheme, an adaptive array technique is currently employed, in which an uplink signal from each user's terminal antenna is received by an array antenna of a base station and extracted with reception directivity through an adaptive array process. A downlink signal to the terminal from the base station is transmitted from the array antenna with transmission directivity to the antenna of the terminal.

Such an adaptive array process is well known in the art and described in detail, for example, in "Chapter 3: MMSE Adaptive Array" in "Adaptive Signal Processing by Array Antenna", Nobuyoshi Kikuma, Kagaku Gijutsu Shuppan, pp. 35–49. Thus, description on its operation principle is not given herein. Further, specific arrangement of a radio apparatus employing the adaptive array processing is well known in the art, as disclosed in detail in International Publication No. WO00/79702 of the present applicant.

In the following, a base station that performs downlink transmission directivity control using such an adaptive array process is referred to as an adaptive array base station.

As for a terminal, one performing selective diversity reception (hereinafter referred to as diversity reception) using a plurality of antennas is known. In reception, such a terminal operates to select one antenna with higher reception level as a reception antenna from, for example, two antennas. Such a conventional diversity reception terminal performs the above mentioned diversity reception regardless of whether the base station to be connected is an adaptive array base station performing transmission directivity control or a non-directivity base station.

FIGS. 8A and 8B schematically shows the connection state between terminals and adaptive array base stations, FIG. 8A showing the connection state between terminals not performing diversity reception and adaptive array base stations, and FIG. 8B showing the connection state between terminals performing diversity reception and adaptive array base stations.

Referring to FIG. 8A, as indicated by a bold arrow, a terminal 3 not performing diversity reception is connected to a desired adaptive array base station 1, and from an array antenna of adaptive array base station 1, a downlink signal is transmitted with transmission directivity to one antenna of terminal 3 that has transmitted an uplink signal. A hatched region D (D: Desired) indicates a state where a beam of signal wave is directed to terminal 3 from adaptive array base station 1.

In this case, terminal 3 can receive the downlink signal from adaptive array base station 1 at the maximum power due to the transmission directivity of desired adaptive array base station 1. The relationship between a terminal 4 not performing diversity reception and its desired adaptive array base station 2 is the same.

Though the signal wave from adaptive array base station 2 as indicated by a broken arrow U (U: Undesired) functions as an interference wave for terminal 3, as can be seen from the emission state of the signal wave in FIG. 8A, the signal power of the interference wave from adaptive array base station 2 received at terminal 3 is of the minimum. The relationship between terminal 4 not performing diversity reception and its non-desired adaptive array base station 1 is the same.

As above, an excellent connection state with less interference can be realized between a terminal not performing diversity reception and a desired adaptive array base station.

On the other hand, referring to FIG. 8B, for example a terminal 5 performing diversity reception transmits an uplink signal from one antenna 5a, establishing a connection relationship with adaptive array base station 1 as indicated by a bold arrow, similarly to the relationship shown in FIG. 8A. Hence, at antenna 5a of terminal 5, a downlink signal from desired adaptive array base station 1 is received at the maximum power, while a transmission signal from a non-desired adaptive array base station 2 (an interference wave) indicated by a broken (fine) arrow is received at the minimum power.

Since beam of signal wave D from desired adaptive array base station 1 is not directed to the other antenna 5b of terminal 5 not transmitting an uplink signal, the power of reception signal from adaptive array base station 1 decreases. Therefore, the power of interference wave U from non-desired adaptive array base station 2 indicated by a broken (bold) arrow relatively increases at antenna 5b.

The similar state occurs at antennas 6a and 6b of a terminal 6 performing diversity reception in the relationship with adaptive array base stations 1 and 2.

The similar problem arises in a spatial multiplexing base station realizing spatial multiple connection using such an adaptive array process. FIGS. 9A and 9B schematically indicate the connecting state between terminals and base stations, FIG. 9A showing connection state between terminals not performing diversity reception and a spatial multiplexing base station, FIG. 9B showing connection state between terminals performing diversity reception and a spatial multiplexing base station.

Referring to FIG. 9A, as indicated by a bold arrow, terminals 30 and 40 not performing diversity reception are connected in spatial multiplexing manner to a desired base station 10 through the adaptive array process, and from an array antenna of spatial multiplexing base station 10, a downlink signal is transmitted with transmission directivity to one antenna of each of terminals 30 and 40 that has transmitted an uplink signal. A hatched region D indicates a state where a beam of signal wave is directed to each of terminals 30 and 40 from spatial multiplexing base station 10.

In this case, terminals 30 and 40 each can receive the downlink signal from base station 10 at the maximum power due to the transmission directivity of the desired base station 10.

As above, an excellent connection state with less interference can be realized between a terminal not performing diversity reception and a desired spatial multiplexing base station.

On the other hand, referring to FIG. 9B, for example a terminal 50 performing diversity reception transmits an uplink signal from one antenna 50a, establishing a connection relationship with spatial multiplexing base station 10 as indicated by a bold arrow, similarly to the relationship shown in FIG. 9A. Hence, at antenna 50a of terminal 50, a downlink signal from desired spatial multiplexing base station 10 is received at the maximum power.

Since beam of signal wave D from desired spatial multiplexing base station 10 is not directed to the other antenna 50b of terminal 50 not transmitting an uplink signal, the power of reception signal U from spatial multiplexing base station 10 decreases. Therefore, the power of interference wave from a non-desired base station that is not shown relatively increases at antenna 50b.

The similar state occurs for antennas 60a and 60b of a terminal 60 performing diversity reception.

As above, at a terminal performing diversity reception, regardless of whether a desired base station is an adaptive array base station controlling downlink transmission directivity, one antenna with higher reception level is selected from two antennas as a reception antenna. Therefore, for example in a terminal 5 of FIG. 8B, when a combined power of a low reception power from desired adaptive array base station 1 and a large interference wave U from non-desired adaptive array base station 2 received at antenna 5b not transmitting an uplink signal exceeds the reception power from a desired adaptive array base station 1 received at antenna 5a that has transmitted an uplink signal, antenna 5b is selected as a reception antenna.

In this case, the signal received at antenna 5b has a large power of interference wave U from non-desired adaptive array base station 2 relative to the downlink reception signal from desired adaptive array base station 1, and hence it is a signal with a large interference component, i.e., a signal with low so-called DU ratio (Desired user's power: Undesired user's power).

Even when an attempt is made to demodulate such a reception signal with low DU ratio at terminal 5, an error occurs in a frame of a demodulation signal and a correct demodulation fails. In special, when the power level of a downlink signal (interference wave) U from non-desired adaptive array base station 2 increases, in the worst case, terminal 5 may inappropriately demodulate a downlink signal that is transmitted to another user's terminal 6 from adaptive array base station 2.

Similar problem arises in the spatial multiplexing base stations shown in FIGS. 9A and 9B.

Thus, in the conventional mobile communication system, when a terminal that performs diversity reception is connected to an adaptive array base station (or a spatial multiplexing base station), the DU ratio at the terminal decreases, and its reception performance is degraded by an interference wave. Accordingly, there exist a problem that the effect of the adaptive array technique to reduce the frequency reuse distance (the minimum distance between base stations that can share the same frequency) is reduced.

Therefore, the object of the present invention is to provide a radio terminal apparatus in which the reception performance is not degraded even when connected to a base station that controls downlink transmission directivity, such as an adaptive array base station or a spatial multiplexing base station, by selecting the reception operation type of the terminal in accordance with the type of the base station to be connected, and to provide a reception operation controlling program thereof.

DISCLOSURE OF THE INVENTION

One aspect of the present invention is a radio terminal apparatus in a mobile communication system, and the mobile communication system includes a plurality of radio base stations. Each of the plurality of radio base stations transmits a signal containing information that identifies a type of the radio base station. The radio terminal apparatus includes determination means for receiving a signal from a radio base station to be connected among the plurality of radio base stations and determining a type of the radio base station based on the information, and selection means for selecting a reception operation mode for receiving a signal from the radio base station in accordance with the determined type of the radio base station.

Another aspect of the present invention is a radio terminal apparatus capable of performing diversity reception using a plurality of antennas in a mobile communication system, and the mobile communication system includes a plurality of radio base stations. Each of the plurality of radio base stations transmits information that identifies whether the radio base station is a radio base station performing an adaptive array operation with directivity. The radio terminal apparatus includes determination means for receiving a signal from a radio base station to be connected among the plurality of radio base stations and determining whether the radio base station is a radio base station performing the adaptive array operation based on the information, and set means for setting an antenna used for a signal transmission to the radio base station among the plurality of antennas to be used for a signal reception from the radio base station that immediately follows the signal transmission when the radio base station is determined to be a radio base station performing the adaptive array operation, and for setting the plurality of antennas to be used for receiving a signal from the radio base station by diversity reception when the radio base station is determined to be a radio base station not performing the adaptive array operation.

Still another aspect of the present invention is a radio terminal apparatus capable of selectively performing adaptive array reception or diversity reception using a plurality of antennas in a mobile communication system, and the mobile communication system includes a plurality of radio base stations. Each of the plurality of radio base stations transmits information that identifies whether the radio base station is a radio base station performing an adaptive array operation with directivity. The radio terminal apparatus includes determination means for receiving a signal from a radio base station to be connected among the plurality of radio base stations, and determining whether the radio base station is a radio base station performing the adaptive array operation based on the information, and set means for setting the plurality of antennas to be used for receiving a signal from the radio base station by adaptive array reception when the radio base station is determined to be a radio base station performing the adaptive array operation, and for setting the plurality of antennas to be used for receiving a signal from the radio base station by diversity reception or adaptive array reception when the radio base station is determined to be a radio base station not performing the adaptive array operation.

Still another aspect of the present invention is a radio terminal apparatus capable of performing diversity reception using a plurality of antennas in a mobile communication system, and the mobile communication system includes a plurality of radio base stations. Each of the plurality of radio base stations transmits information that identifies whether the radio base station is a radio base station performing a spatial multiplexing operation with directivity. The radio terminal apparatus includes determination means for receiving a signal from a radio base station to be connected among the plurality of radio base stations, and determining whether the radio base station is a radio base station performing the spatial multiplexing operation based on the information, and set means for setting an antenna used for a signal transmission to the radio base station among the plurality of antennas to be used for a signal reception from the radio base station that immediately follows the signal transmission when the radio base station is determined to be a radio base station performing the spatial multiplexing operation, and for setting the plurality of antennas to be used for receiving a signal from the radio base station by diversity reception when the radio base station is determined to be a radio base station not performing the spatial multiplexing operation.

Still another aspect of the present invention is a radio terminal apparatus capable of selectively performing adaptive array reception or diversity reception using a plurality of antennas in a mobile communication system, and the mobile communication system includes a plurality of radio base stations. Each of the plurality of radio base stations transmits information that identifies whether the radio base station is a radio base station performing a spatial multiplexing operation with directivity. The radio terminal apparatus includes determination means for receiving a signal from a radio base station to be connected among the plurality of radio base stations, and determining whether the radio base station is a radio base station performing the spatial multiplexing operation based on the information, and set means for setting the plurality of antennas to be used for receiving a signal from the radio base station by adaptive array reception when the radio base station is determined to be a radio base station performing the spatial multiplexing operation, and for setting the plurality of antennas to be used for receiving a signal from the radio base station by diversity reception or adaptive array reception when the radio base station is determined to be a radio base station not performing the spatial multiplexing operation.

Still another aspect of the present invention is a reception operation control program for controlling a reception operation in a radio terminal apparatus in a mobile communication system, and the mobile communication system includes a plurality of radio base stations. Each of the plurality of radio base stations transmits a signal containing information that identifies a type of the radio base station. The reception operation control program causes a computer to execute a determination step of receiving a signal from a radio base station to be connected among the plurality of radio base stations and determining a type of the radio base station based on the information, and a selection step of selecting a reception operation mode for receiving a signal from the radio base station in accordance with the determined type of the radio base station.

Still another aspect of the present invention is a reception operation control program for controlling a reception operation in a radio terminal apparatus capable of performing diversity reception using a plurality of antennas in a mobile communication system, and the mobile communication system includes a plurality of radio base stations. Each of the plurality of radio base stations transmits information that identifies whether the radio base station is a radio base station performing an adaptive array operation with directivity. The reception operation control program causes a computer to execute a determination step of receiving a signal from a radio base station to be connected among the plurality of radio base stations and determining whether the radio base station is a radio base station performing the adaptive array operation based on the information, and a set step of setting an antenna used for a signal transmission to the radio base station among the plurality of antennas to be used for a signal reception from the radio base station that immediately follows the signal transmission when the radio base station is determined to be a radio base station performing the adaptive array operation, and for setting the plurality of antennas to be used for receiving a signal from the radio base station by diversity reception when the radio base station is determined to be a radio base station not performing the adaptive array operation.

Still another aspect of the present invention is a reception operation control program for controlling a reception operation in a radio terminal apparatus capable of selectively performing adaptive array reception or diversity reception using a plurality of antennas in a mobile communication system, and the mobile communication system includes a plurality of radio base stations. Each of the plurality of radio base stations transmits information that identifies whether the radio base station is a radio base station performing an adaptive array operation with directivity. The reception operation control program causes a computer to execute a determination step of receiving a signal from a radio base station to be connected among the plurality of radio base stations and determining whether the radio base station is a radio base station performing the adaptive array operation based on the information, and a set step of setting the plurality of antennas to be used for receiving a signal from the radio base station by adaptive array reception when the radio base station is determined to be a radio base station performing the adaptive array operation, and for setting the plurality of antennas to be used for receiving a signal from the radio base station by diversity reception or adaptive array reception when the radio base station is determined to be a radio base station not performing the adaptive array operation.

Still another aspect of the present invention is a reception operation control program for controlling a reception operation in a radio terminal apparatus capable of performing diversity reception using a plurality of antennas in a mobile communication system, and the mobile communication system includes a plurality of radio base stations. Each of the plurality of radio base stations transmits information that identifies whether the radio base station is a radio base station performing spatial multiplexing operation with directivity. The reception operation control program causes a computer to execute a determination step of receiving a signal from a radio base station to be connected among the plurality of radio base stations and determining whether the radio base station is a radio base station performing the spatial multiplexing operation based on the information, and a set step of setting an antenna used for a signal transmission to the radio base station among the plurality of antennas to be used for a signal reception from the radio base station that immediately follows the signal transmission when the radio base station is determined to be a radio base station performing the spatial multiplexing operation, and for setting the plurality of antennas to be used for receiving a signal from the radio base station by diversity reception when the radio base station is determined to be a radio base station not performing the spatial multiplexing operation.

Still another aspect of the present invention is a reception operation control program for controlling a reception operation in a radio terminal apparatus capable of selectively performing adaptive array reception or diversity reception using a plurality of antennas in a mobile communication system, and the mobile communication system includes a plurality of radio base stations. Each of the plurality of radio base stations transmits information that identifies whether the radio base station is a radio base station performing a spatial multiplexing operation with directivity, the reception operation control program causes a computer to execute a determination step of receiving a signal from a radio base station to be connected among the plurality of radio base stations and determining whether the radio base station is a radio base station performing the spatial multiplexing operation based on the information, and a set step of setting the plurality of antennas to be used for receiving a signal from the radio base station by adaptive array reception when the radio base station is determined to be a radio base station performing the spatial multiplexing operation, and for setting the plurality of antennas to be used for receiving a signal from the radio base station by diversity reception or adaptive array reception when the radio base station is determined to be a radio base station not performing the spatial multiplexing operation.

As above, according to the present invention, a radio terminal apparatus can realize optimum reception method corresponding to an operation type of a radio base station to be connected, by automatically selecting a reception operation of the terminal in accordance with a type of the base station to be connected, and degradation of reception performance at the terminal can be prevented.

In special, when a radio base station is an adaptive array base station or a spatial multiplexing base station, by causing a radio terminal apparatus capable of performing diversity reception to set an antenna used for a transmission to be used for an immediately following reception, an excellent reception from the radio base station with transmission directivity can be attained at the radio terminal apparatus, and consequently, reduction of interference component can be attained.

Further, when a radio base station is an adaptive array base station or a spatial multiplexing base station, by causing a radio terminal apparatus capable of performing adaptive array reception or diversity reception to set adaptive array reception, an excellent reception from the radio base station without interference wave can be attained at the radio terminal apparatus, and reduction of interference component can be attained.

BRIEF DESCRIPTION OF THE DRAWINGS

FIGS. 8A and 8B are conceptual views schematically showing an operation principle of a conventional mobile communication system.

BEST MODES FOR CARRYING OUT THE INVENTION

Figure 1:
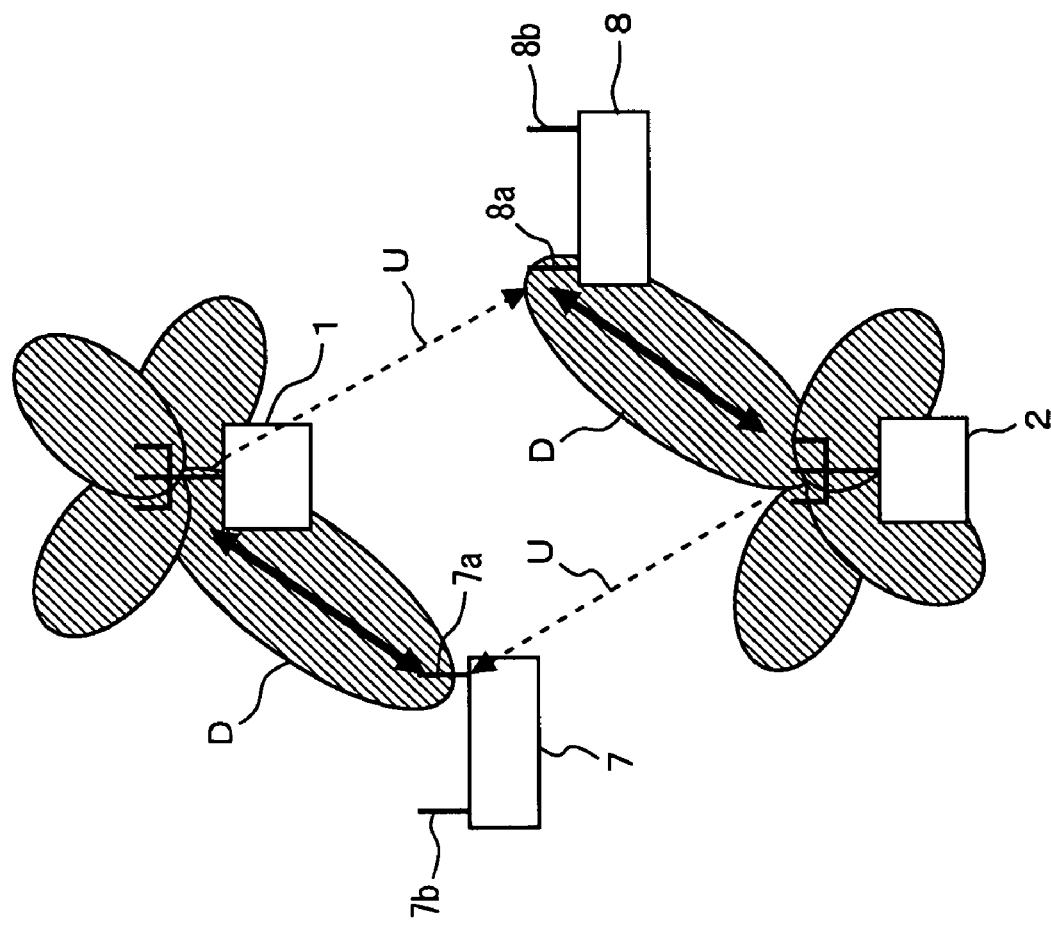
FIG. 1 is a conceptual view schematically showing an operation principle of a first embodiment of the present invention.

In the following, embodiments of the present invention are described in detail referring to the figures. Throughout the figures, identical or corresponding parts are given the identical reference character, and its description is not repeated.

FIRST EMBODIMENT

FIG. 1 is a conceptual view schematically showing an operation principle of a first embodiment of the present invention, and more specifically, it illustrates a connection state between terminals that can perform diversity reception and adaptive array base stations.

Referring to FIG. 1, adaptive array stations 1 and 2 are assumed to transmit in a constant cycle identification information indicating that they are adaptive array base stations that performs transmission directivity control using, for example, an adaptive array technique.

Terminals 7 and 8 are terminals that normally performs diversity reception, and when recognizing that the desired base station to be connected is an adaptive array base station based on the above mentioned identification information, they stop to perform the selective diversity reception that is based on a reception level as indicated in FIG. 8B, and transit to a reception operation described below.

In a transmission/reception to/from an adaptive array base station with transmission directivity, the transmission directivity of a downlink signal from an array antenna of the adaptive array base station is directed to the antenna of a terminal that has transmitted an uplink signal.

Therefore, according to the first embodiment of the present invention, when a base station to be connected is recognized to be an adaptive array base station, diversity reception in which a reception antenna is switched in accordance with reception level is stopped at the terminal, and the antenna selection is controlled to constantly use one antenna among a plurality of (e.g., two) diversity antennas, which is used for transmitting an uplink signal to the base station in one frame, for receiving a downlink signal from the base station in an immediately following frame.

For instance, in the example of FIG. 1, when terminal 7 determines that desired base station 1 is an adaptive array base station, one antenna 7a used for transmitting an uplink signal in one frame is used for receiving a downlink signal from an array antenna of base station 1 in an immediately following frame. As a result, the beam of signal wave D is directed to antenna 7a, establishing an excellent connection between terminal 7 and base station 1 as indicated by a bold arrow and minimizing the level of interference wave U from non-desired base station 2.

Though not shown, when the uplink signal is transmitted to base station 1 by the other antenna 7b, this antenna 7b is likewise used for receiving the downlink signal from base station 1 in an immediately following frame, and an excellent connection is established, with the beam of signal wave D of base station 1 being directed to antenna 7b.

The relationship between terminal 8 that can perform diversity reception and its desired adaptive array base station 2 is the same.

Figure 2:
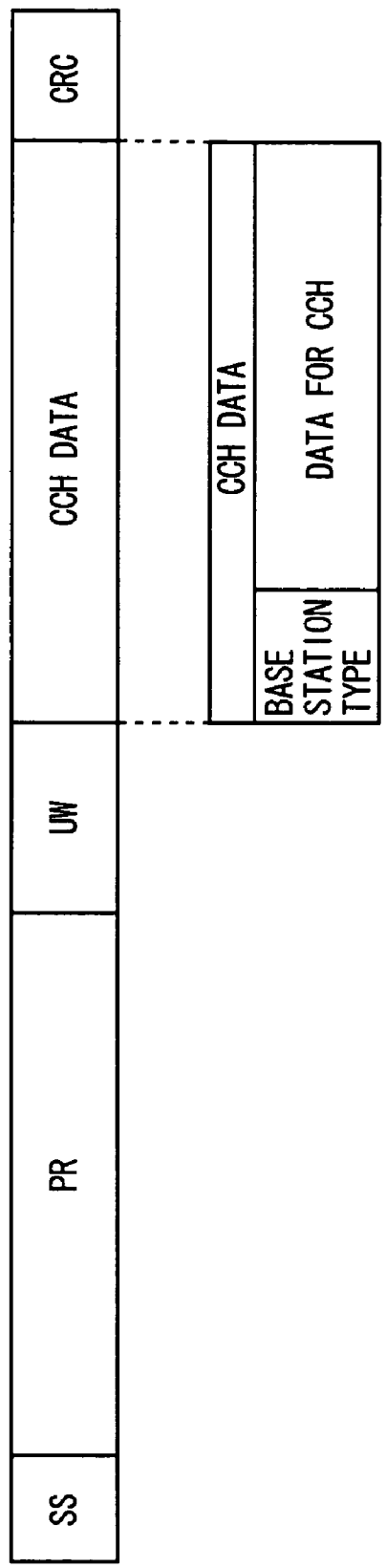
FIG. 2 is a schematic view showing one example of a frame format used in the first embodiment of the present invention.

FIG. 2 is a schematic view showing one example of a frame format used in the first embodiment of the present invention.

As described above, in the first embodiment of the present invention, each base station constituting the mobile communication system transmits in a constant cycle identification information indicating the type of an operation of the base station, more specifically, indicating whether the base station is an adaptive array base station that performs downlink transmission directivity control.

FIG. 2 schematically shows a format of one frame of a downlink control channel CCH transmitted from each base station.

Referring to FIG. 2, one frame of a downlink signal from a base station is configured with a start symbol SS, a preamble PR, a unique word UW, a data of control channel CCH, and an error checking bit CRC.

The data of control channel CCH can further be separated to an information bit for identifying the type of the base station and a data for control channel CCH. More specifically, the information bit for identifying the base station type is information identifying whether the base station transmitting this downlink signal frame is an adaptive array base station that controls downlink transmission directivity.

Note that the location of the identification information is merely an example, and it can be inserted in the downlink transmission signal frame at any location.

Figure 3:
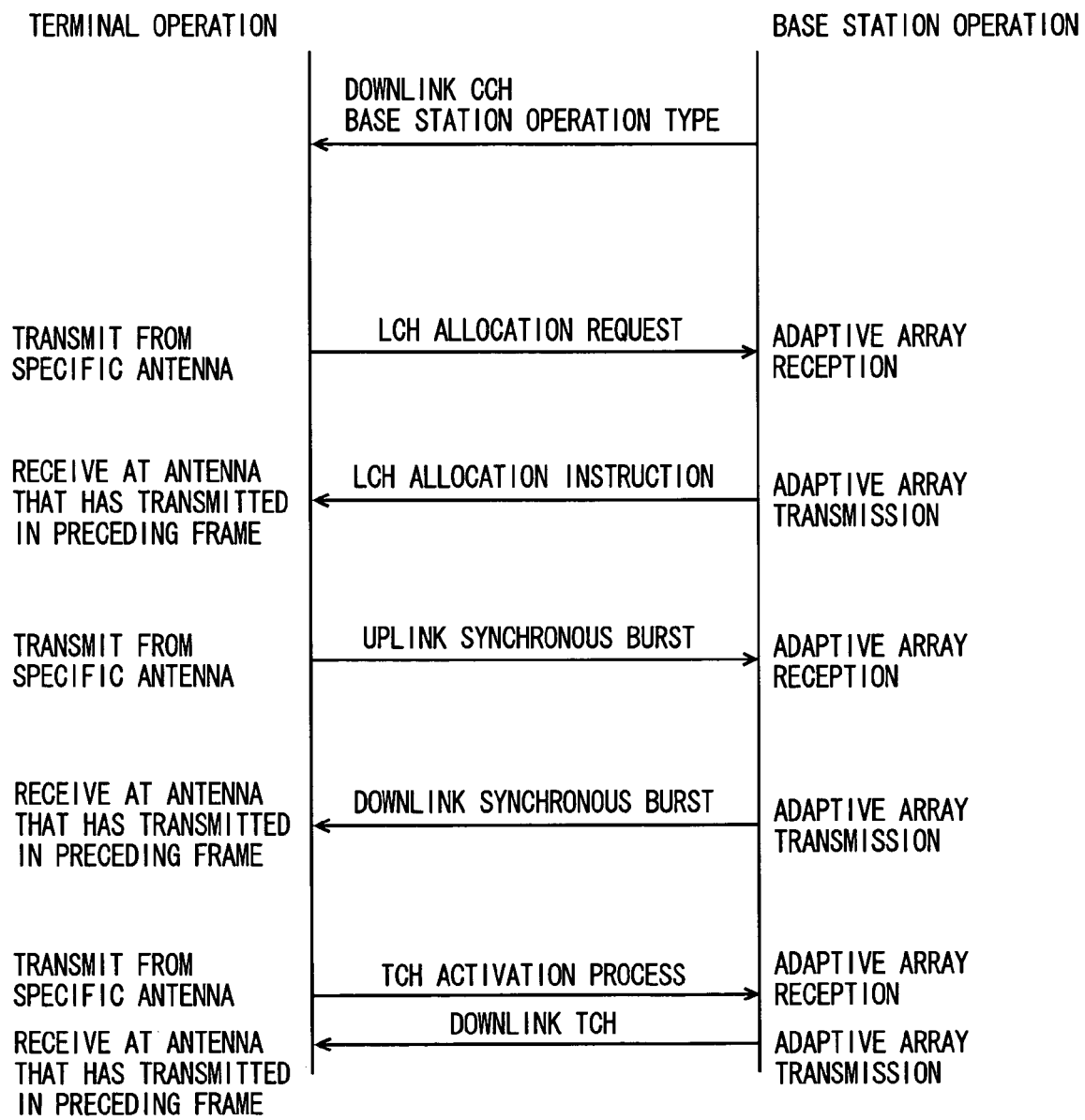
FIG. 3 is a timing diagram indicating a signal transmission/reception state between a terminal and a base station according to the first embodiment of the present invention.

Next, FIG. 3 is a timing diagram indicating a manner of signal transmission/reception between a terminal and a base station according to the first embodiment of the present invention.

Referring to FIG. 3, when the base station to be connected is an adaptive array base station, information identifying an operation type of the base station (a bit indicating that the base station is an adaptive array base station that performs downlink transmission control) is contained in control channel CCH of a downlink signal frame as shown in FIG. 2 and transmitted from the base station.

The terminal receiving it recognizes that the base station is an adaptive array base station and transmits a link channel LCH allocation request to the base station from a particular antenna among a plurality of diversity reception antennas.

The adaptive array base station receives this uplink signal by the adaptive array operation, and transmits an LCH allocation instruction in the next frame by the adaptive array operation.

The terminal receives this LCH allocation instruction, which has been transmitted from the base station with transmission directivity, at the antenna that had transmitted the LCH allocation request in the previous frame.

On reception, the terminal transmits an uplink synchronous burst to the base station from a particular antenna among a plurality of diversity reception antennas.

The adaptive array base station receives this uplink synchronous burst by the adaptive array operation, and transmits a downlink synchronous burst in the next frame by the adaptive array operation.

The terminal receives this downlink synchronous burst, which has been transmitted from the base station with transmission directivity, at the antenna that had transmitted the uplink synchronous burst in the previous frame.

On reception, the terminal transmits a traffic channel TCH activation process to the base station from a particular antenna among a plurality of diversity reception antennas.

The adaptive array base station receives this traffic channel TCH activation process by the adaptive array operation, and transmits a downlink traffic channel TCH in the next frame by the adaptive array operation.

The terminal receives this downlink traffic channel TCH, which has been transmitted from the base station with transmission directivity, at the antenna that had transmitted the traffic channel TCH activation process in the previous frame.

Figure 4:
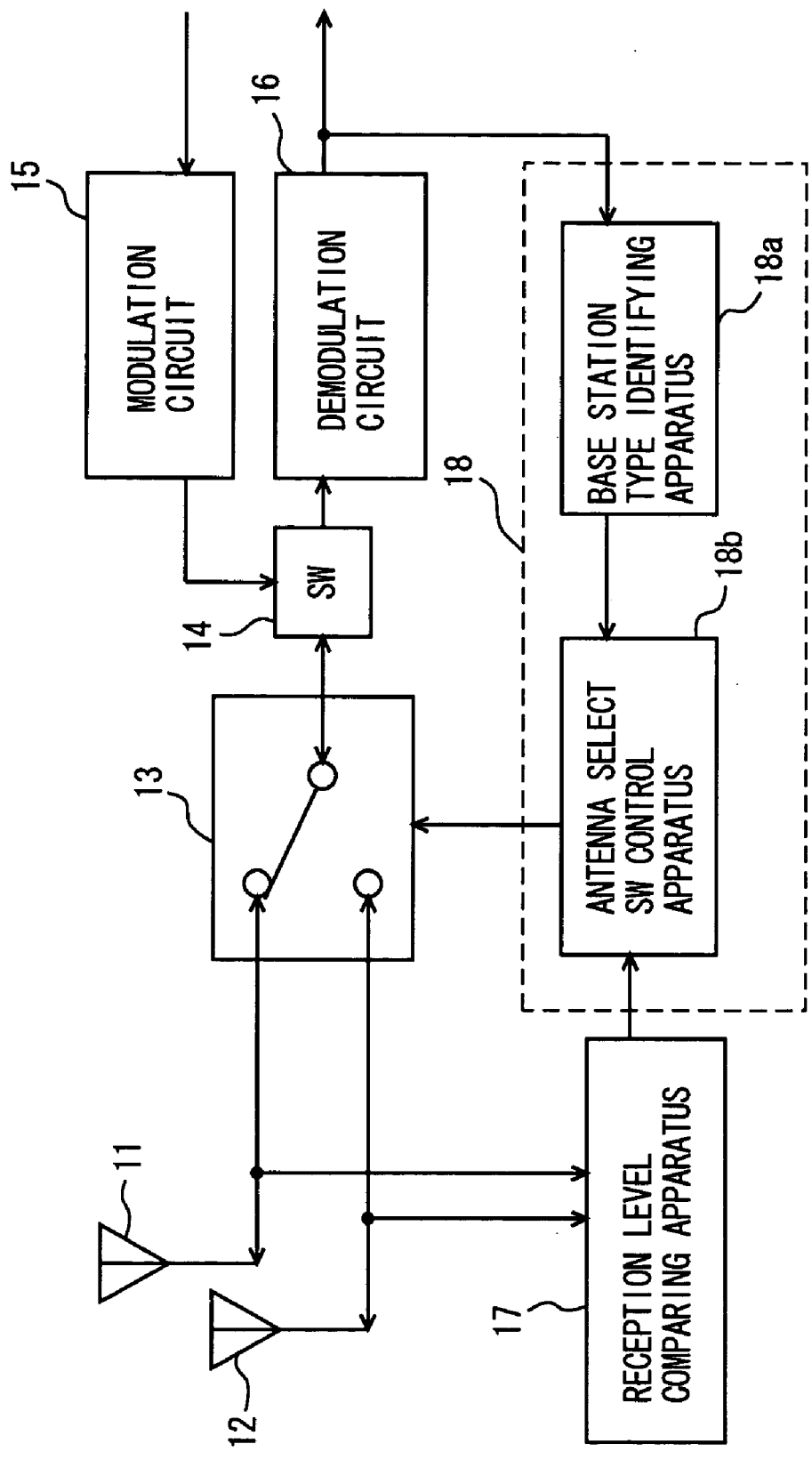
FIG. 4 is a functional block diagram showing a system configuration of a terminal according to the first embodiment of the present invention.

FIG. 4 is a functional block diagram showing a system configuration of a terminal according to the first embodiment of the present invention for realizing above mentioned operation principle.

Referring to FIG. 4, two antennas 11, 12 are connected to two fixed terminals of antenna select switch 13, while a movable terminal of switch 13 is connected to a transmission/reception signal alternating switch 14.

To switch 14, a modulation circuit 15 and a demodulation circuit 16 are connected. The output of demodulation circuit 16 is provided to a digital signal processor DSP 18.

The outputs of antennas 11, 12 are provided to a reception level comparing apparatus 17. The output of reception level comparing apparatus is likewise provided to DSP 18. The inside of DSP indicated by a broken line 18 shows processes realized with software by DSP in functional blocks.

Specifically, the output of demodulation circuit 16 is provided to a base station type identifying apparatus 18a, of which output is provided to an antenna select switch control apparatus 18b. The output of reception level comparing apparatus 17 is likewise provided to antenna select switch control apparatus 18b.

The output of antenna select switch control apparatus 18b is provided to a switch-controlled input of antenna select switch 13.

Now, detailed description is given on the operation of the terminal shown in FIG. 4. This terminal is capable of performing diversity reception, and a normal diversity operation will be described.

First, in transmission, a signal from a signal source such as a microphone that is not shown is modulated by modulation circuit 15 and provided to the movable terminal of antenna select switch 13 via switch 14.

An uplink signal is transmitted by one antenna that is selected by this switch 13 from antennas 11, 12.

In reception, the reception levels of signals received at antennas 11, 12, respectively, are compared to each other by reception level comparing apparatus 17, and the comparison result is provided to antenna select switch control apparatus 18b. Control apparatus 18b controls switch 13 to select the antenna output with larger reception level.

The reception signal from selected one antenna is provided to demodulation circuit 16 via switch 14 and demodulated. The signal thus demodulated is provided to a speaker or the like that is not shown to be played back. This is the usual diversity reception operation.

Figure 5:
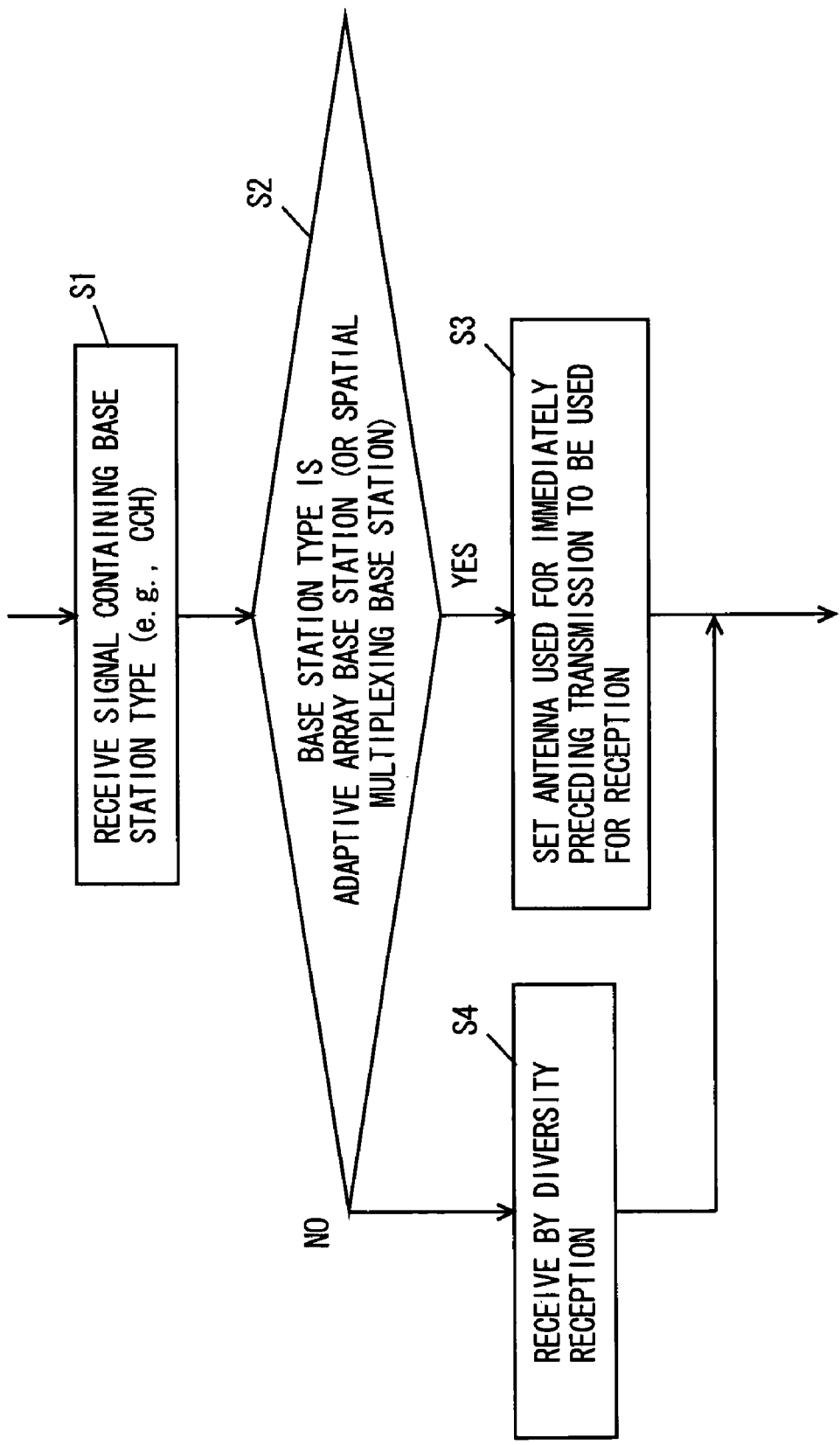
FIG. 5 is a flow chart showing an operation of the terminal according to the first embodiment shown in FIG. 4.

Next, FIG. 5 is a flow chart showing an operation according to the first embodiment of the present invention that is executed with software by DSP 18 in the terminal shown in FIG. 4.

First, a signal containing base station type information (e.g., downlink control channel CCH) that is received from the base station at either one of antennas 11, 12 is demodulated by demodulation circuit 16 and received at DSP 18 (base station type identifying apparatus 18a) (step S1).

Based on the received base station type information, DSP 18 determines whether the base station is an adaptive array base station (step S2).

If the base station is determined to be an adaptive array base station at step S2, then as described referring to FIGS. 1 and 3, DSP 18 (antenna select switch control apparatus 18b) sets a select operation of antenna select switch 13 to receive a downlink signal in the next frame at the antenna used for transmitting an uplink signal in an immediately preceding frame (step S3).

The method for selecting an antenna for transmitting an uplink signal is not specifically limited. For example, one possible method is to calculate the average reception level of several frames for each antenna for using an antenna with the high value for transmission.

Though the immediately preceding frame in the first embodiment refers to one preceding frame of 2.5 microseconds as determined in the PHS specification, the present invention is not limited to this period.

If the base station is determined not to be an adaptive array base station (the base station is a non-directivity base station not performing downlink transmission directivity control) at step S2, DSP 18 (antenna select switch control apparatus 18b) sets the select operation of antenna select switch 13 to receive a downlink signal by the above mentioned diversity reception (step S4).

Figure 9B:
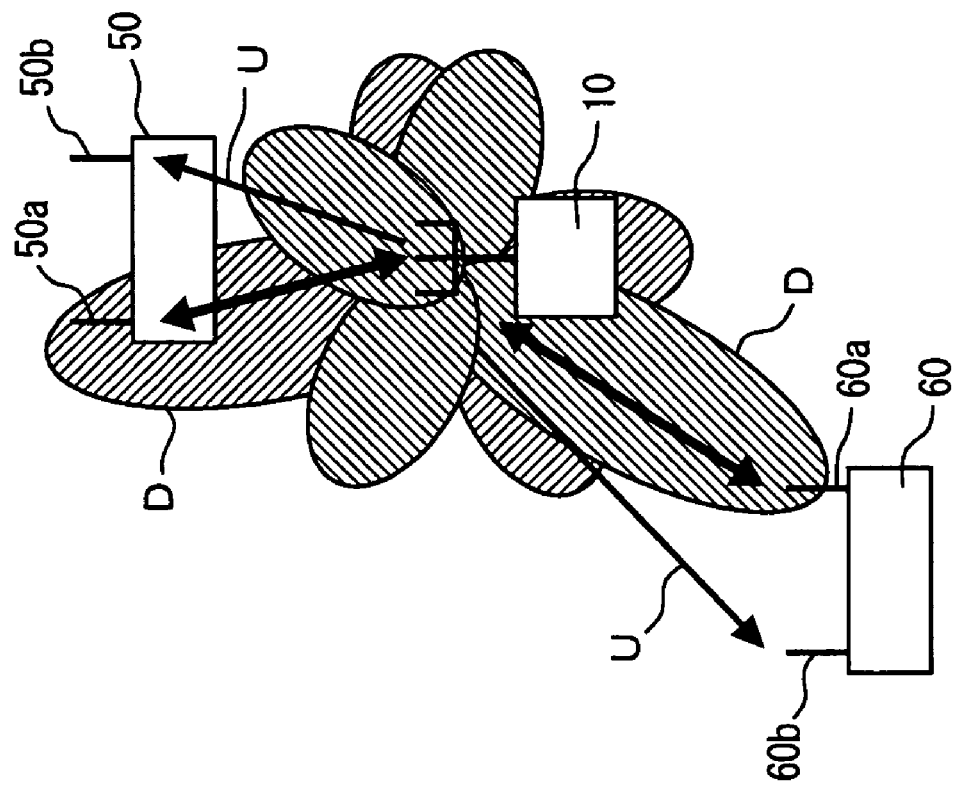
FIGS. 9A and 9B are conceptual views schematically showing another operation principle of a conventional mobile communication system.
Figure 9A:
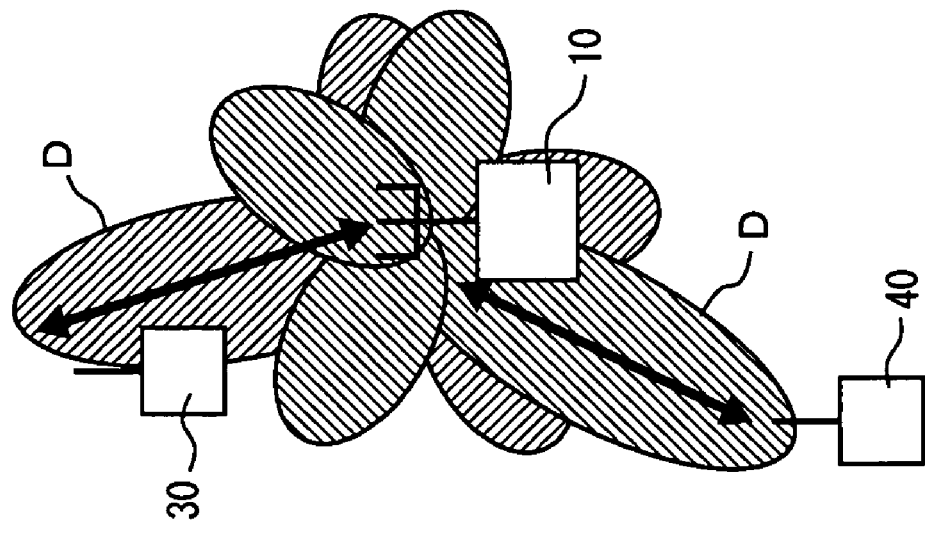

Note that, when the adaptive array base station is a spatial multiplexing base station that is connected to a plurality of terminals in a spatial multiplexing manner using the adaptive array technique, as described referring to FIGS. 9A and 9B, the process in FIG. 5 can be carried out as well (see step S2 in FIG. 5).

As above, according to the first embodiment of the present invention, when a base station is determined to be an adaptive array base station (or a spatial multiplexing base station), by causing a terminal capable of performing diversity reception to stop performing diversity reception, and to set the antenna used for transmission to be used for immediately following reception, an excellent reception with transmission directivity from the base station is attained at the terminal, and consequently, the improvement of DU ratio can be attained.

SECOND EMBODIMENT

Figure 6:
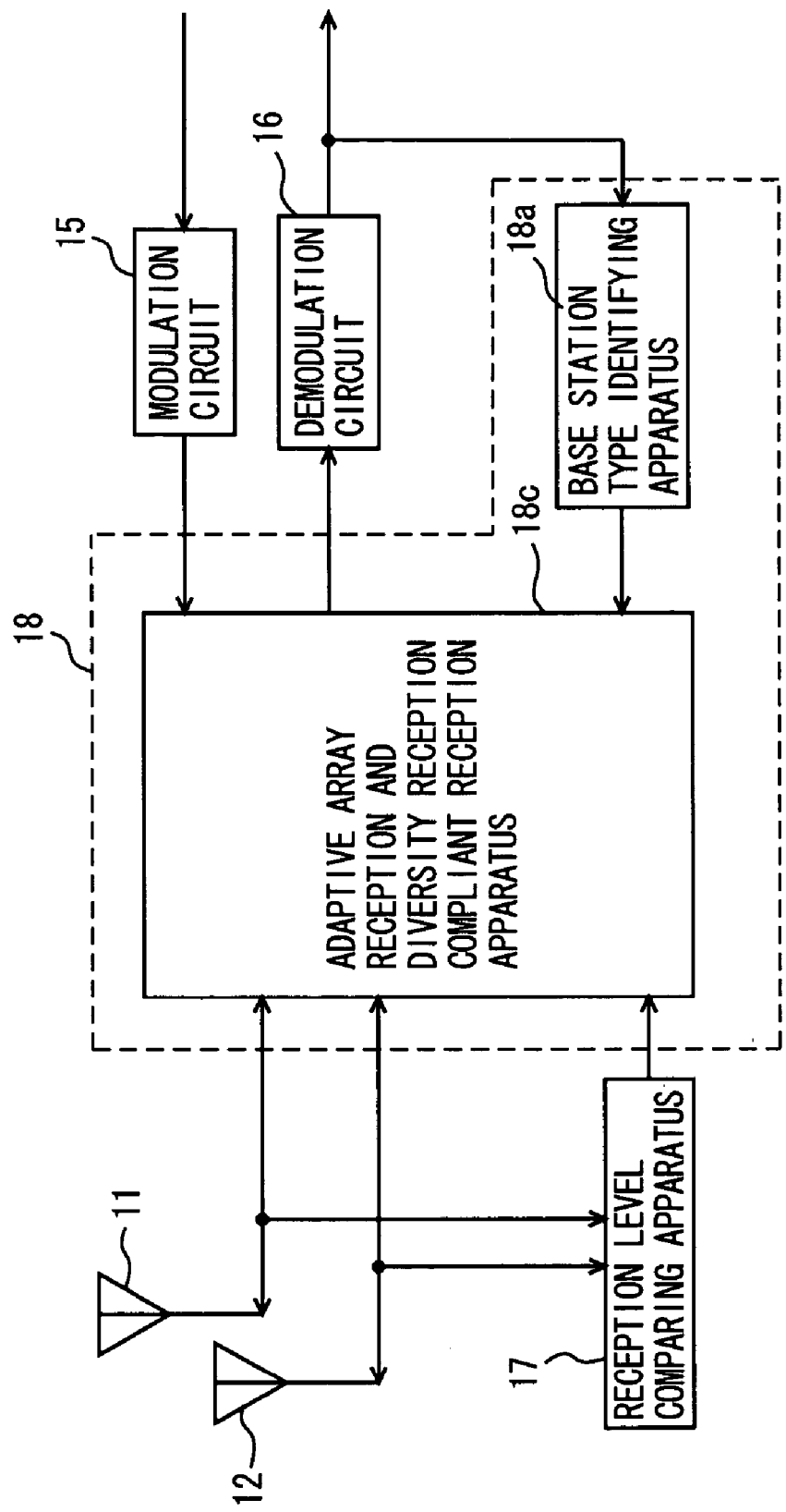
FIG. 6 is a functional block diagram showing a system configuration of a terminal according to a second embodiment of the present invention.

FIG. 6 is a functional block diagram showing a system configuration of a terminal according to a second embodiment of the present invention for realizing an operation principle of the present invention.

The terminal according to the second embodiment shown in FIG. 6 is different from the terminal according to the first embodiment shown in FIG. 4 in the following aspect. In the first embodiment of FIG. 4, when connecting to an adaptive array base station, transmission directivity of the base station is used effectively by receiving at the same antenna of a terminal that is used in the transmission, whereas in the second embodiment of FIG. 6, when connecting to an adaptive array base station, an attempt is made to remove an interference wave in a downlink signal by performing adaptive array reception at a terminal as well.

In FIG. 6, the inside of DSP as indicated by a broken line 18 shows the processes realized with software by DSP in functional blocks, and configured with a base station type identifying apparatus 18a, and adaptive array reception and diversity reception compliant reception apparatus 18c.

Antennas 11, 12, modulation circuit 15, demodulation circuit 16, reception level comparing apparatus 17, and base station type identifying apparatus 18a are connected to adaptive array reception and diversity reception compliant reception apparatus 18c.

The terminal shown in FIG. 6 is a terminal capable of selectively performing diversity reception and adaptive array reception by using a plurality of antennas. In other words, diversity reception and adaptive array reception are selectively performed with software by adaptive array reception and diversity reception compliant reception apparatus 18c.

The operation of diversity reception and adaptive array reception is well known in the art, and can selectively be realized using DSP (software) easily.

Figure 7:
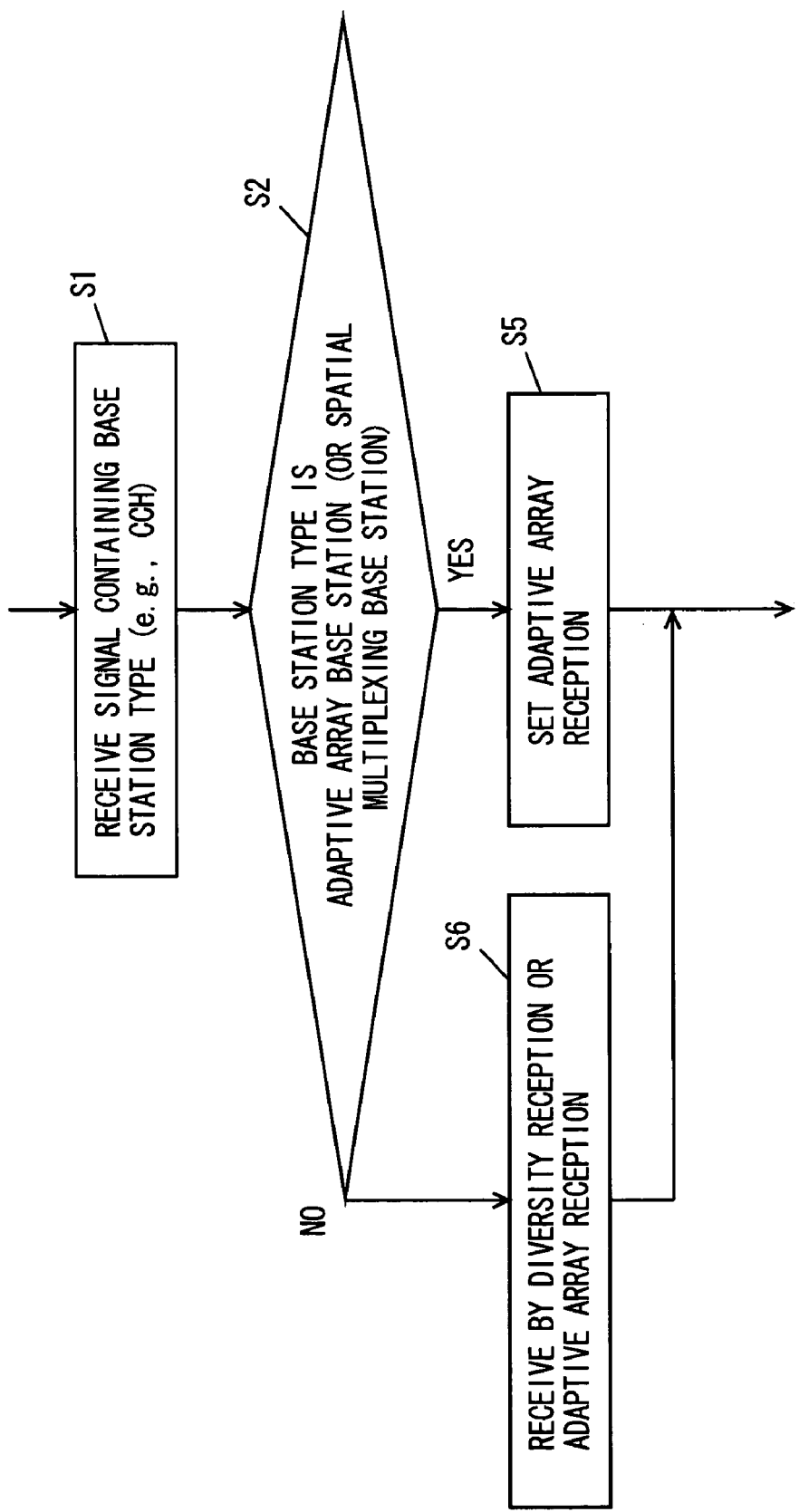
FIG. 7 is a flow chart showing an operation of the terminal according to the second embodiment shown in FIG. 6.

Next, FIG. 7 is a flow chart showing an operation according to the second embodiment executed with software by DSP 18 in the terminal shown in FIG. 6.

First, a signal containing base station type information (e.g., downlink control channel CCH) received at either one of antennas 11, 12 from the base station is demodulated by demodulation circuit 16 and received at DSP 18 (base station type identifying apparatus 18a) (step S1).

Based on the received base station type information, DSP 18 determines whether the base station is an adaptive array base station (step S2).

If the base station is determined to be an adaptive array base station at step S2, then DSP 18 (adaptive array reception and diversity reception compliant reception apparatus 18c) sets the reception operation to receive a downlink signal in the next frame by adaptive array operation (step S5).

If the base station is determined not to be an adaptive array base station (i.e., to be a non-directivity base station) at step S2, then DSP 18 (adaptive array reception and diversity reception compliant reception apparatus 18c) sets the reception operation to receive a downlink signal by diversity reception or adaptive array reception (step S6).

Note that, when the adaptive array base station is a spatial multiplexing base station that is connected to a plurality of terminals in a spatial multiplexing manner using adaptive array technique, as described referring to FIGS. 9A and 9B, the processes in FIG. 7 can be carried out as well (see step S2 in FIG. 7).

As above, according to the second embodiment of the present invention, when a base station is determined to be an adaptive array base station (or a spatial multiplexing base station), by causing a terminal capable of performing adaptive array reception or diversity reception to stop performing diversity reception, and to set adaptive array reception, an excellent reception without interference wave is attained at the terminal, and consequently, the improvement of DU ratio can be attained.

Though in each embodiment above, description has been made on the case in which adaptive array base station that performs spatial multiplexing connection by adaptive array process is employed as a spatial multiplexing base station for connecting to a plurality of terminals, the present invention can be applied to any base station using any processing technique other than adaptive array process, as long as it is a base station enabling spatial multiplexing connection with downlink directivity control.

As above, according to the present invention, a terminal can realize optimum reception method corresponding to an operation type of a base station (whether it is a base station performing downlink transmission directivity control or not) to be connected, by automatically selecting a reception operation of the terminal in accordance with a type of the base station to be connected, and degradation of reception performance at the terminal can be prevented.

INDUSTRIAL APPLICABILITY

According to the present invention, since optimum reception method is selected at a terminal in accordance with presence/absence of a control of downlink transmission directivity of a base station, it is effective for a mobile communication system involving a base station performing transmission directivity control.

The invention claimed is:

1. A radio terminal apparatus in a mobile communication system, said mobile communication system including a plurality of radio base stations, each of said plurality of radio base stations transmitting a signal containing information that identifies a type of the radio base station, said radio terminal apparatus comprising:
    determination means for receiving a signal from a radio base station to be connected among said plurality of radio base stations, and determining a type of the radio base station based on said information; and
    selection means for selecting a reception operation mode regarding reception directivity for receiving a signal from the radio base station in accordance with the determined type of the radio base station.

2. A radio terminal apparatus capable of performing diversity reception using a plurality of antennas in a mobile communication system, said mobile communication system including a plurality of radio base stations, each of said plurality of radio base stations transmitting information that identifies whether the radio base station is a radio base station performing an adaptive array operation with directivity, said radio terminal apparatus comprising:
    determination means for receiving a signal from a radio base station to be connected among said plurality of radio base stations, and determining whether the radio base station is a radio base station performing said adaptive array operation based on said information; and
    set means for setting an antenna used for a signal transmission to the radio base station among said plurality of antennas to be used for a signal reception from the radio base station that immediately follows the signal transmission when the radio base station is determined to be a radio base station performing said adaptive array operation, and for setting said plurality of antennas to be used for receiving a signal from the radio base station by diversity reception when the radio base station is determined to be a radio base station not performing said adaptive array operation.

3. A radio terminal apparatus capable of selectively performing adaptive array reception or diversity reception using a plurality of antennas in a mobile communication system, said mobile communication system including a plurality of radio base stations, each of said plurality of radio base stations transmitting information that identifies whether the radio base station is a radio base station performing an adaptive array operation with directivity, said radio terminal apparatus comprising:
    determination means for receiving a signal from a radio base station to be connected among said plurality of radio base stations, and determining whether the radio base station is a radio base station performing said adaptive array operation based on said information; and
    set means for setting said plurality of antennas to be used for receiving a signal from the radio base station by adaptive array reception when the radio base station is determined to be a radio base station performing said adaptive array operation, and for setting said plurality of antennas to be used for receiving a signal from the radio base station by diversity reception or adaptive array reception when the radio base station is determined to be a radio base station not performing said adaptive array operation.

4. A radio terminal apparatus capable of performing diversity reception using a plurality of antennas in a mobile communication system, said mobile communication system including a plurality of radio base stations, each of said plurality of radio base stations transmitting information that identifies whether the radio base station is a radio base station performing a spatial multiplexing operation with directivity, said radio terminal apparatus comprising:
    determination means for receiving a signal from a radio base station to be connected among said plurality of radio base stations, and determining whether the radio base station is a radio base station performing said spatial multiplexing operation based on said information; and
    set means for setting an antenna used for a signal transmission to the radio base station among said plurality of antennas to be used for a signal reception from the radio base station that immediately follows the signal transmission when the radio base station is determined to be a radio base station performing said spatial multiplexing operation, and for setting said plurality of antennas to be used for receiving a signal from the radio base station by diversity reception when the radio base station is determined to be a radio base station not performing said spatial multiplexing operation.

5. A radio terminal apparatus capable of selectively performing adaptive array reception or diversity reception using a plurality of antennas in a mobile communication system, said mobile communication system including a plurality of radio base stations, each of said plurality of radio base stations transmitting information that identifies whether the radio base station is a radio base station performing a spatial multiplexing operation with directivity, said radio terminal apparatus comprising:
    determination means for receiving a signal from a radio base station to be connected among said plurality of radio base stations, and determining whether the radio base station is a radio base station performing said spatial multiplexing operation based on said information; and
    set means for setting said plurality of antennas to be used for receiving a signal from the radio base station by adaptive array reception when the radio base station is determined to be a radio base station performing said spatial multiplexing operation, and for setting said plurality of antennas to be used for receiving a signal from the radio base station by diversity reception or adaptive array reception when the radio base station is determined to be a radio base station not performing said spatial multiplexing operation.

6. A method for controlling a reception operation in a radio terminal apparatus in a mobile communication system, said mobile communication system including a plurality of radio base stations, each of said plurality of radio base stations transmitting a signal containing information that identifies a type of the radio base station, said method comprising the steps of:
    a determination step of receiving a signal from a radio base station to be connected among said plurality of radio base stations, and determining a type of the radio base station based on information contained in the received signal; and a selection step of selecting a reception operation mode regarding reception directivity for receiving a signal from the radio base station in accordance with the determined type of the radio base station.

7. A method for controlling a reception operation in a radio terminal apparatus capable of performing diversity reception using a plurality of antennas in a mobile communication system, said mobile communication system including a plurality of radio base stations, each of said plurality of radio base stations transmitting information that identifies whether the radio base station is a radio base station performing an adaptive array operation with directivity, comprising the steps of:

a determination step of receiving a signal from a radio base station to be connected among said plurality of radio base stations, and determining whether the radio base station is a radio base station performing said adaptive array operation based on information contained in the received signal; and a set step of setting an antenna used for a signal transmission to the radio base station among said plurality of antennas to be used for a signal reception from the radio base station that immediately follows the signal transmission when the radio base station is determined to be a radio base station performing said adaptive array operation, and for setting said plurality of antennas to be used for receiving a signal from the radio base station by diversity reception when the radio base station is determined to be a radio base station not performing said adaptive array operation.

8. A method for controlling a reception operation in a radio terminal apparatus capable of selectively performing adaptive array reception or diversity reception using a plurality of antennas in a mobile communication system, said mobile communication system including a plurality of radio base stations, each of said plurality of radio base stations transmitting information that identifies whether the radio base station is a radio base station performing an adaptive array operation with directivity, said method comprising the steps of:

a determination step of receiving a signal from a radio base station to be connected among said plurality of radio base stations, and determining whether the radio base station is a radio base station performing said adaptive array operation based on said information contained in the received signal; and a set step of setting said plurality of antennas to be used for receiving a signal from the radio base station by adaptive array reception when the radio base station is determined to be a radio base station performing said adaptive array operation, and for setting said plurality of antennas to be used for receiving a signal from the radio base station by diversity reception or adaptive array reception when the radio base station is determined to be a radio base station not performing said adaptive array operation.

9. A method for controlling a reception operation in a radio terminal apparatus capable of performing diversity reception using a plurality of antennas in a mobile communication system, said mobile communication system including a plurality of radio base stations, each of said plurality of radio base stations transmitting information that identifies whether the radio base station is a radio base station performing spatial multiplexing operation with directivity, said method comprising the steps of:

a determination step of receiving a signal from a radio base station to be connected among said plurality of radio base stations, and determining whether the radio base station is a radio base station performing said spatial multiplexing operation based on information contained in the received signal; and a set step of setting an antenna used for a signal transmission to the radio base station among said plurality of antennas to be used for a signal reception from the radio base station that immediately follows the signal transmission when the radio base station is determined to be a radio base station performing said spatial multiplexing operation, and for setting said plurality of antennas to be used for receiving a signal from the radio base station by diversity reception when the radio base station is determined to be a radio base station not performing said spatial multiplexing operation.

10. A method for controlling a reception operation in a radio terminal apparatus capable of selectively performing adaptive array reception or diversity reception using a plurality of antennas in a mobile communication system, said mobile communication system including a plurality of radio base stations, each of said plurality of radio base stations transmitting information that identifies whether the radio base station is a radio base station performing a spatial multiplexing operation with directivity, said method comprising the steps of:

a determination step of receiving a signal from a radio base station to be connected among said plurality of radio base stations, and determining whether the radio base station is a radio base station performing said spatial multiplexing operation based on information contained in the received signal; and a set step of setting said plurality of antennas to be used for receiving a signal from the radio base station by adaptive array reception when the radio base station is determined to be a radio base station performing said spatial multiplexing operation, and for setting said plurality of antennas to be used for receiving a signal from the radio base station by diversity reception or adaptive array reception when the radio base station is determined to be a radio base station not performing said spatial multiplexing operation.

* * * * *